United States Patent
Nagy et al.

(10) Patent No.: US 11,012,014 B2
(45) Date of Patent: May 18, 2021

(54) MOTOR DRIVE UNIT OF A DC ELECTRIC MOTOR

(71) Applicant: The Swatch Group Research and Development Ltd, Marin (CH)

(72) Inventors: Laurent Nagy, Liebefeld (CH); Christophe Germiquet, Preles (CH); Jean-Jacques Born, Morges (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/671,408

(22) Filed: Nov. 1, 2019

(65) Prior Publication Data

US 2020/0186065 A1   Jun. 11, 2020

(30) Foreign Application Priority Data

Dec. 6, 2018   (EP) .................................. 18210867

(51) Int. Cl.
*H02P 7/291*   (2016.01)
*G04C 3/16*   (2006.01)

(52) U.S. Cl.
CPC ............... *H02P 7/291* (2016.02); *G04C 3/16* (2013.01)

(58) Field of Classification Search
CPC .............. H05G 1/66; H02P 7/291; G04C 3/16
See application file for complete search history.

(56) References Cited

U.S. PATENT DOCUMENTS

| 4,430,007 A | 2/1984 | Wiget et al. |
| 5,105,141 A * | 4/1992 | Ernest ............... H05G 1/66 318/805 |
| 5,510,688 A | 4/1996 | Schwarz |
| 2014/0265947 A1 | 9/2014 | Hsu |

FOREIGN PATENT DOCUMENTS

| GB | 2 082 806 A | 3/1982 |
| JP | S48-35311 A | 5/1973 |
| JP | S55-37515 U | 3/1980 |
| JP | 2002-218793 A | 8/2002 |

OTHER PUBLICATIONS

European Search Report dated Jun. 5, 2019 in European Application 18210867.0 filed on Dec. 6, 2018.
Japanese Office Action dated Dec. 8, 2020, issued in Japanese Patent Application No. 2019-211079 (with English translation).

* cited by examiner

*Primary Examiner* — Cortez M Cook
(74) *Attorney, Agent, or Firm* — Oblon, McClelland, Maier & Neustadt, L.L.P.

(57) ABSTRACT

A motor drive unit for driving a direct current electric motor including a moving part equipped with permanent magnets. The motor drive unit, which is powered by a voltage supply source, includes a switch circuit, an inductor circuit and a capacitor circuit including a set of capacitors. By selectively opening and closing the switches of the switch circuit, a series of consecutive low energy pulses can be generated such that the power consumption of the motor drive circuit is minimized.

19 Claims, 9 Drawing Sheets

MOTOR DRIVE UNIT OF A DC ELECTRIC MOTOR

CROSS-REFERENCE TO RELATED APPLICATION

This application claims priority to European Patent Application No. 18210867.0 filed on Dec. 6, 2018, the entire disclosure of which is hereby incorporated herein by reference.

TECHNICAL FIELD

The present invention relates to a motor drive unit for driving an electric motor, such as a brushless direct current (DC) electric motor. The proposed motor drive unit is particularly suited for driving electric motors of small dimensions as used for instance in horological applications and more specifically in electromechanical watch movements. The invention also relates to a method of operating the motor drive unit.

BACKGROUND OF THE INVENTION

DC electric motors are well known and have been around for quite a long time. These motors convert electrical energy into mechanical energy for many types of applications. Electromechanical mobile devices, such as electromechanical wristwatches, often comprise a DC motor and are powered by DC sources, such as batteries. One example of a DC motor is a permanent magnet DC motor. This kind of DC motor has no brushes and has typically permanent magnets on the rotor. The stator comprises coils, which typically do not move. This kind of electric motor allows for smaller design and results in reduced power consumption.

In horological applications, stepper motors are generally used. Specific commands generate drive (voltage) pulses, which make the rotor advance step by step. Stepper motors are brushless DC motors, which divide a full rotation into a number of equal steps. The stator defines stable positions for the rotor with permanent magnets. There are typically two or three stable positions per one full rotation of 360 degrees. To be able to generate the pulses, a sufficient voltage level is needed. Voltage supplies used in these motors, especially when used in electromechanical watches, typically generate a voltage level between 1.2 V and 1.5 V. Consequently, batteries available for these applications supply a voltage in this range of values. Continuous rotation DC electric motors have the advantage over stepper motors that when used in horological applications, the watch hands can be rotated continuously. This makes the operation of these watches similar to mechanical watches. In this manner noise caused by the steps of the rotor, which could be disturbing in particular at night time, can be avoided.

A DC motor is controlled by a motor drive unit. The drive units are typically arranged to alternate the current that travels in the stator coils and thus the direction of the magnetic flux lines which are coupled to the magnets of the rotor. An H-bridge circuit is an example implementation of a motor drive unit. The term H-bridge is derived from the typical graphical representation of this kind of circuit comprising four switches arranged between a supply voltage node and ground. By opening and closing these switches in a desired manner, a positive or negative voltage can be selectively applied across the inductor circuit of the motor. In other words, by manipulating the four switches depending on the position of the rotor or more specifically on the rotor magnets, a current can be arranged to travel through the stator coils selectively in a first direction, and in a second, opposite direction.

Joule heating, also known as Ohmic or resistive heating, is the process by which the passage of an electric current through a conductor produces heat. Joule's first law states that the power of heating $P_j$ generated by an electrical conductor is proportional to the product of its resistance R and the square of the current I: $P_j = R \times I^2$. However, the useful mechanical power $P_{mec}$ is proportional to the current, but not to its square: $P_{mec} = k_u \times w \times I$, where $k_u$ is the torque constant and w is the rotational speed of the rotor. Thus, it becomes clear that in order to minimise the resistive heating losses, the supply current should be kept as low as possible while however keeping the motor torque sufficiently high.

The usual way to address this problem is to use the so-called PWM (Pulse Width Modulation) technique. By switching the supply voltage with a specific duty cycle, it is possible to regulate the output current at a desired level. Such a technique is efficient for stepper motors supplied by standard batteries. However, the efficiency of this technique depends of the modulation frequency which has to be higher than the inverse of the LR circuit time constant. Typically for a horological stepper motor, the modulation frequency is in the kHz range.

For a rotor configured to rotate continuously it could be advantageous to not have any detent torque when the inductor are not energized. For example the use of coreless inductors enables to achieve this condition. In return the inductivity of these inductors is several order of magnitude smaller than inductors with the same characteristics but ferromagnetic cores. In these conditions, a coreless inductor circuit requires switching frequencies in the MHz range for efficient PWM modulation. This range of frequencies is not recommended for low power applications.

As a consequence, the currently available motor drive units do not satisfactorily and efficiently address this problem.

SUMMARY OF THE INVENTION

It is an object of the present invention to overcome the problem identified above relating to power consumption of motor drive units of DC motors. More specifically, the present invention aims to minimise the power consumption of motor drive units of continuous rotation DC motors, where induced voltage levels in the stator coils are much less (e.g. three to four times less) than the supply voltage level provided by the battery.

According to a first aspect of the invention, there is provided a motor drive unit for driving a direct current electric motor comprising a stator and a moving part equipped with permanent magnets, the motor drive unit comprising:
- a power supply source for providing a supply voltage to the motor drive unit, the supply voltage having a value $V_{bat}$ relative to a reference voltage node;
- a switch circuit comprising a set of switches between the power supply source and the reference voltage node;
- an inductor circuit forming the stator and arranged so as to be electromagnetically coupled to the rotor permanent magnets, this inductor circuit being connected through the switch circuit to the power supply source and to the reference voltage node;
- a capacitor circuit comprising N capacitors, N being a positive integer greater than zero, each of the capacitors being arranged between the reference voltage node and a respective inductor circuit facing node connected through the switch circuit to the inductor circuit; and
a control circuit for controlling opening and closing of the switches;

wherein the control circuit is configured to selectively open and close the switches to allow the motor drive unit to generate successive series of drive voltage pulses each comprising N+1 successive drive voltage pulses having each a given duration and triggered at a given time instant, so that each drive voltage pulse causes a voltage drop across the inductor circuit which, in a normal functioning mode, is greater than an induced voltage across the inductor circuit during this drive voltage pulse; and wherein the control circuit is configured to generate each series of drive voltage pulses such that: —first, the power supply source is connected through the inductor circuit to a first capacitor for generating a first drive voltage pulse; —then, if N>1, the inductor circuit is connected between an (n−1):th capacitor and an n:th capacitor, n being a positive integer between 2 and N (both included), for generating an n:th drive voltage pulse; and—finally, the inductor circuit is connected between an N:th capacitor and the reference voltage node for generating a last drive voltage pulse.

According to a preferred embodiment, each one of the N capacitors is characterised by a capacitance value, the durations of the N+1 drive voltage pulses of each series are all substantially the same and the capacitance values of the N capacitors are all substantially the same, so that, in a steady operational state of the motor drive unit, the voltage drop across the inductor circuit substantially equals Vbat/(N+1) for each one of the N+1 drive voltage pulses.

According to a preferred variant of the preferred embodiment, the supply voltage value $V_{bat}$ divided by a maximum induced voltage across the inductor circuit in the normal functioning mode of the motor is greater than N−1. The control circuit is configured to selectively open and close the switches such that each drive voltage pulse is generated when the induced voltage across the inductor circuit is substantially at an absolute maximum.

By 'absolute maximum', it is comprised a maximum in absolute value. By 'induced voltage in/of a coil or across an inductor circuit' it is understood the induced voltage (caused by the rotation or turning of the rotor) between the two terminals of the coil or of the inductor circuit. The normal functioning mode of the motor corresponds to a mode or a phase where the moving part of the rotor is moving within a given speed range under normal conditions.

The proposed solution has the advantage that the resistive heating losses can be minimised while still providing the required torque to operate the motor as desired. In other words, the overall power consumption of the motor drive unit can be minimised without however compromising the motor performance. The invention takes advantage of the fact that the voltage level needed for supplying a continuous rotation DC electric motor of the horological type generally does not have to be as high as the voltage provided by classical batteries for horological applications. Such batteries are designed in particular for stepper motors. Indeed, horological stepper motors generally need a higher supply voltage than continuous rotation DC electric motors used for similar applications.

According to a second aspect of the invention, there is provided an electromechanical watch equipped with a DC electric motor comprising a continuous rotation rotor with permanent magnets and the motor drive unit according to the first aspect of the invention.

According to a third aspect of the invention, there is provided a method of operating the motor drive unit as recited in claims 15.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF THE INVENTION

Figure 1:
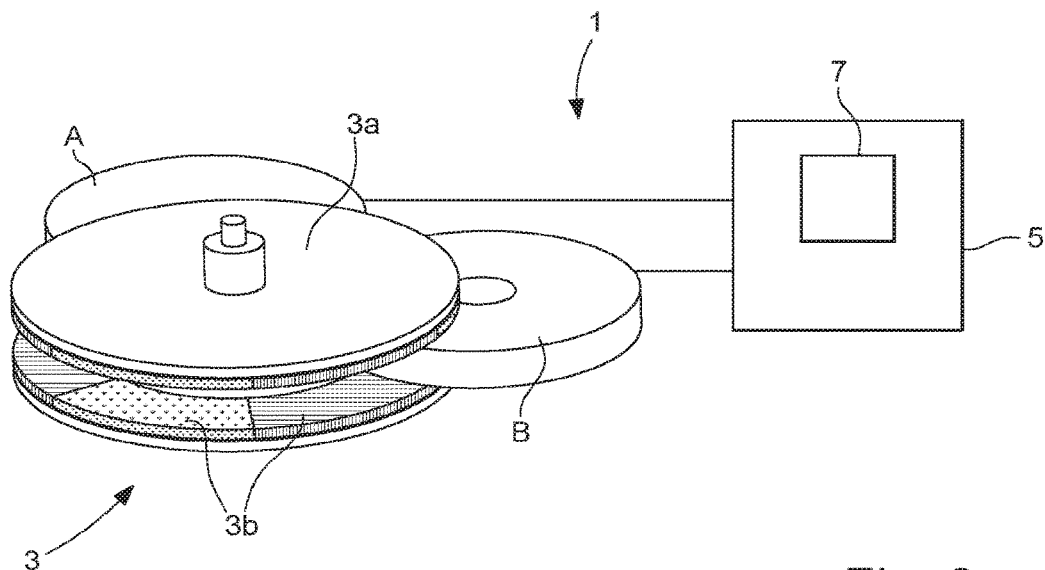
FIG. 1 illustrates in a simplified and schematic manner a DC electric motor where the teachings of the present invention may be applied.

An embodiment of the present invention will now be described in detail with reference to the attached figures. The invention will be described in the context of a motor drive circuit or unit for controlling a continuous rotation DC electric motor of a watch, such as a wristwatch, where the rotor of the motor is equipped with bipolar permanent magnets. However, the teachings of the invention are not limited to this environment or application. Identical or corresponding functional and structural elements which appear in different drawings are assigned the same reference numerals. As utilised herein, "and/or" means any one or more of the items in the list joined by "and/or". The word "comprise" is interpreted by the broader meaning "include" or "contain".

FIG. 1 illustrates schematically and in a simplified manner a DC electric motor 1, where the invention may be applied. The motor 1 as shown in FIG. 1 comprises a rotor 3, with permanent bipolar magnets 3b regularly arranged on two ferromagnetic discs 3a, and stator formed by a first inductor A and a second inductor B. The rotor is arranged to continuously rotate in a first direction but optionally also in a second, opposite direction. A motor drive or control unit 5 is configured to adjust the current through the inductors or coils and thereby to drive the rotor 3. A digital control unit or circuit or simply a controller 7 is in turn configured to control the operation of the motor drive unit based on the detected operation of the rotor. For instance, if the control unit 7 detects that the rotor is spinning too slowly, it can order the motor drive unit 5 to accelerate the rotor 3. It is to be noted that in the present example, the motor drive unit 5 (including the control unit 7) is considered to be part of the motor but it could instead be considered not to be part of it.

Figure 2:
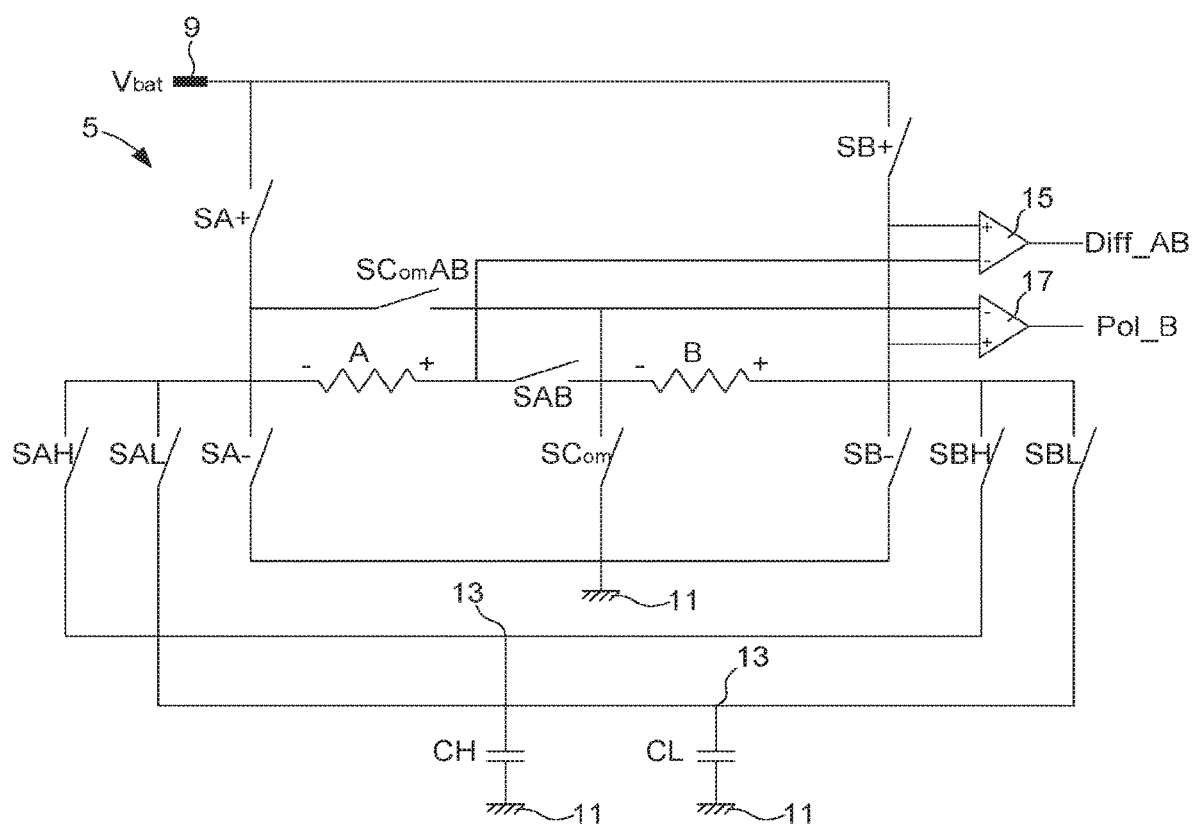
FIG. 2 is a circuit diagram illustrating a motor drive circuit according to an example of the present invention.

FIG. 2 illustrates a circuit diagram of the motor drive control unit 5 according to an example of the present invention. The circuit of FIG. 2 however omits the digital control unit 7, which as such is not the focus of the present invention. The circuit of FIG. 2 comprises a supply voltage source 9, such as a battery, for providing a supply voltage Vbat for the circuit. In the present example, the supply voltage level is initially substantially equal to 1.5 V, but it may drop down to 1.2 V over time. As is further shown in FIG. 2, the circuit also comprises a switch circuit between the supply voltage source and a reference voltage node 11, which is at a constant electric potential. In the example shown in FIG. 2, the reference voltage node 11 is grounded (i.e. at zero potential). The switch circuit of FIG. 2 includes 11 switches. First to fourth switches SA+, SA−, SB+ and SB− form a traditional H-bridge. Fifth to ninth switches SAH, SAL, SBH, SBL, SAB are used to divide the supply voltage as explained later. Tenth and eleventh switches SComAB, SCom are used for instance to start up the motor, to monitor its operation and/or to slow it down. The motor drive circuit in this example also comprises two inductors or coils, namely the first inductor A and the second inductor B, together forming an inductor circuit. The two inductors A, B are in this configuration connected in series with the switch SAB arranged between them. However, the inductors could instead be in parallel. Furthermore, the teachings of the invention are not limited to configurations having two inductors. In other words, configurations having for instance only one inductor or more than two inductors, such as three inductors, are equally possible.

In this example, the switches are transistors, such as n-type metal-oxide-semiconductor field effect transistors (MOSFETs). The operation of the switches is controlled by the digital control unit 7. More specifically, the control unit is configured to adjust the gate voltage of the transistors to adjust the conductivity of the channel between source and drain nodes. In this manner, the switches are arranged to be either closed or open. In the present description, when a switch is said to be closed, then the path between the source and drain nodes is electrically conductive, whereas when a switch is said to be open, then this path is not electrically conductive.

The example circuit configuration of FIG. 2 further comprises a capacitor circuit comprising a set of capacitors, in this example two capacitors, namely a first capacitor CH with a first capacitance and a second capacitor CL with a second capacitance. In this example, the first capacitance substantially equals the second capacitance, although this does not have to be the case. A first capacitor node of each capacitor is connected to the reference voltage node 11, while a second capacitor node 13, referred to as an inductor circuit facing node, is connected through the switch circuit to the inductor circuit.

The motor drive circuit of FIG. 2 also comprises a measurement circuit formed by a comparator set comprising a first comparator 15 and a second comparator 17. Each of the two comparators has an analogue negative input terminal or node, an analogue positive input terminal or node and one binary output terminal or node. The negative input terminal of the first comparator is connected to a first terminal of the first inductor A, while the positive input terminal of the first comparator 15 is connected to a first terminal of the second inductor B. The negative input terminal of the second comparator is connected to a second terminal of the second inductor B and through the switches SComAB and SAH to the first capacitor CH. The positive input terminal of the second comparator 17 is connected to the first terminal of the second inductor B. It is to be noted that all the comparator input signals are analogue voltage values. The first and second comparators are used to measure certain parameters in the circuit as explained later in more detail.

Figure 3:
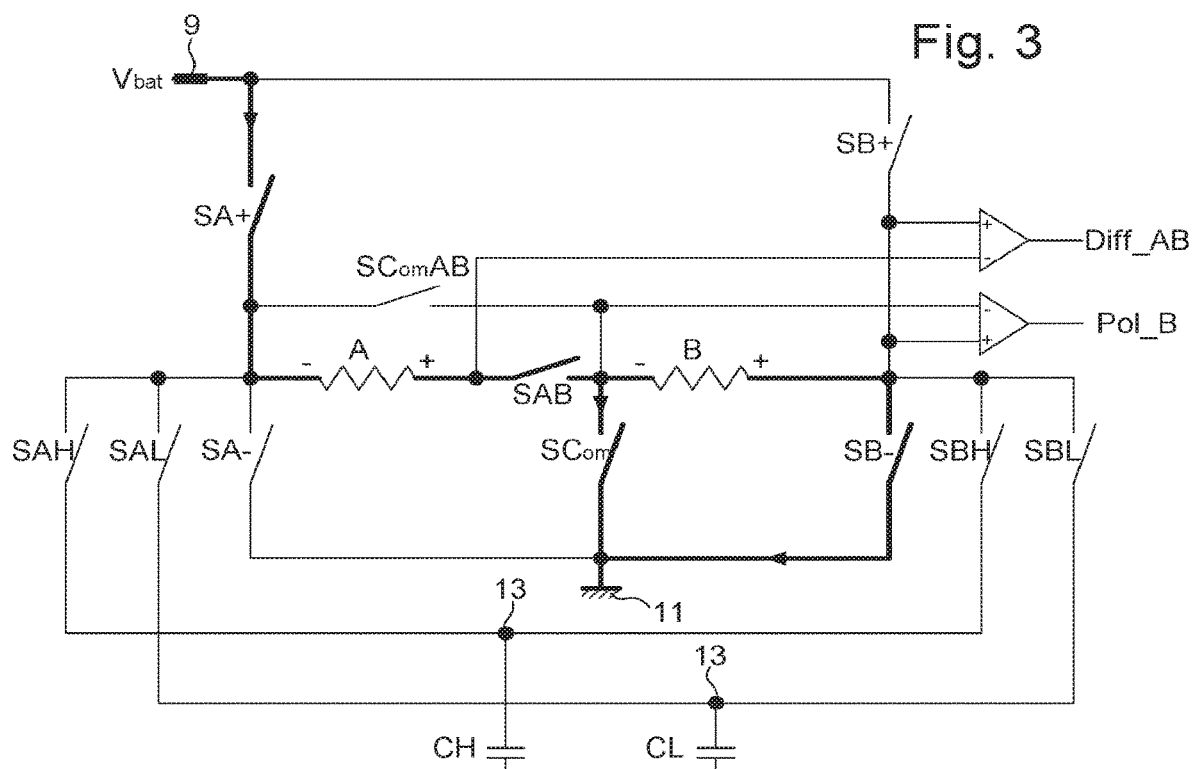
FIG. 3 shows the circuit of FIG. 2 and further illustrates how the current flows in the circuit during a first start-up phase.

The operation of the drive circuit is next explained in more detail. A start-up phase consists of two phases, namely of a first start-up phase with a first duration and a second start-up phase with a second duration. The first duration is typically much longer than the second duration. The first start-up phase involves centring a magnet pair (north-north or south-south) of the rotor at the first inductor A by applying the voltage Vbat across the inductor circuit. This is done by closing the switches SA+, SAB and SCom and by short circuiting the second inductor B by closing the switch SB−. In this manner the rotor oscillations can be damped. The duration of the first start-up phase is in this example 700 ms. FIG. 3 illustrates how the current is arranged to flow in the circuit during the first start-up phase.

Figure 4:
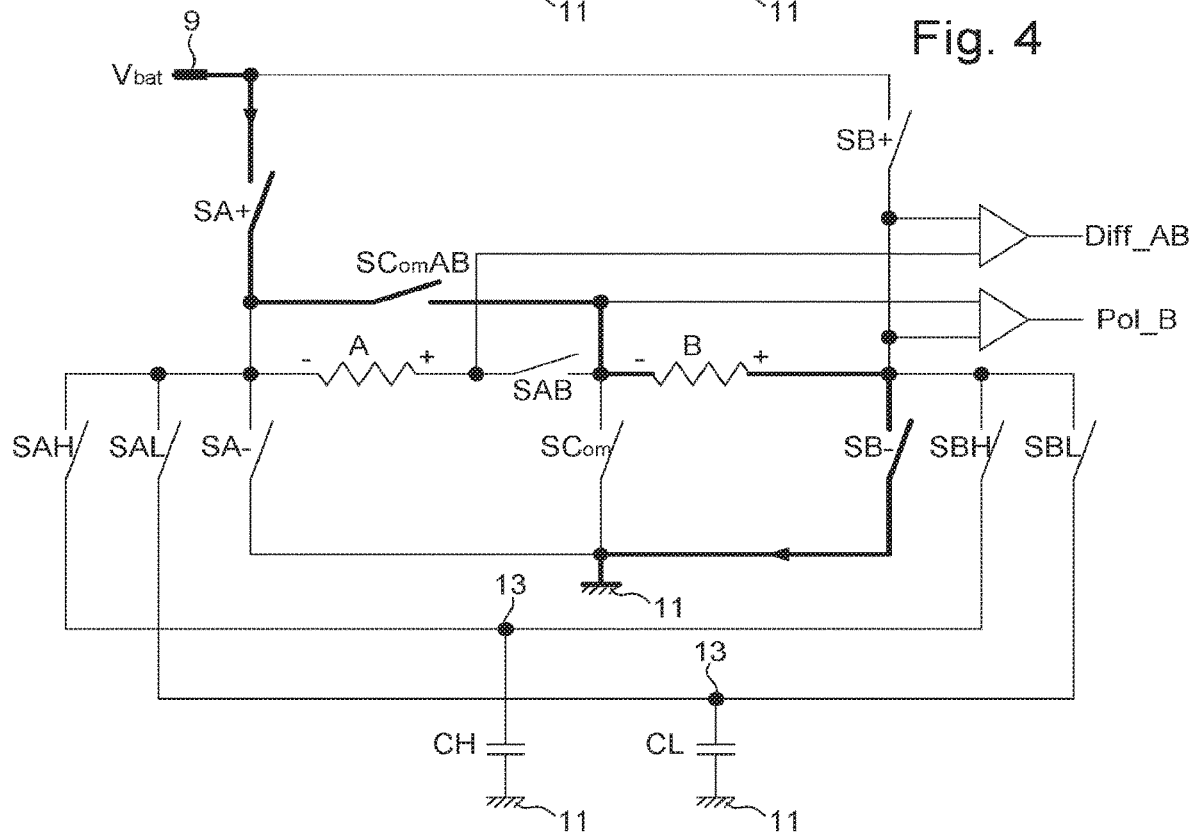
FIG. 4 shows the circuit of FIG. 2 and further illustrates how the current flows in the circuit during a second start-up phase.

During the second start-up phase no current flows through the first inductor because the switches SAB and SCom are open. During this phase, the voltage supply source 9 is connected directly to the second inductor B by closing the switch SComAB. The duration of the second start-up phase is in this example 30 ms. FIG. 4 illustrates how the current is arranged to flow in the circuit during the second start-up phase.

Figure 5:
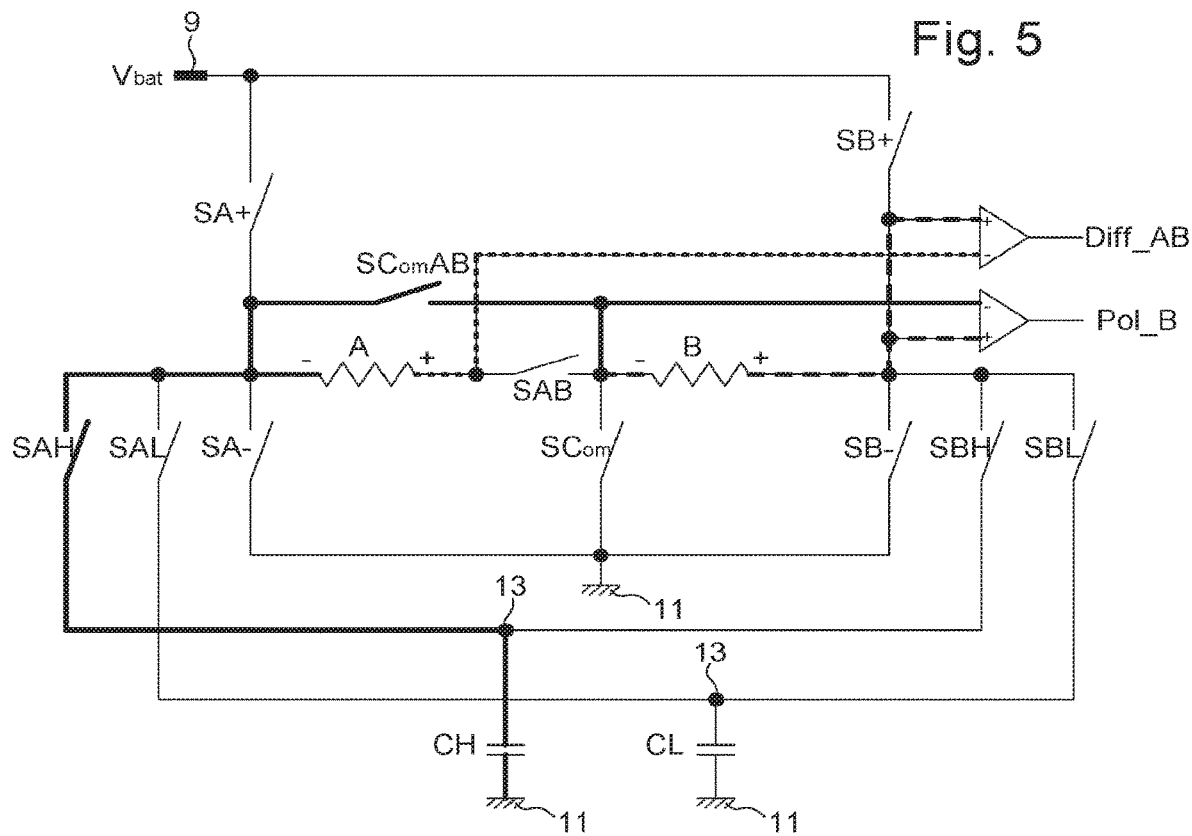
FIG. 5 shows the circuit of FIG. 2 and further illustrates how the electrical connections are made in the circuit during a measurement phase of the circuit.
Figure 6:
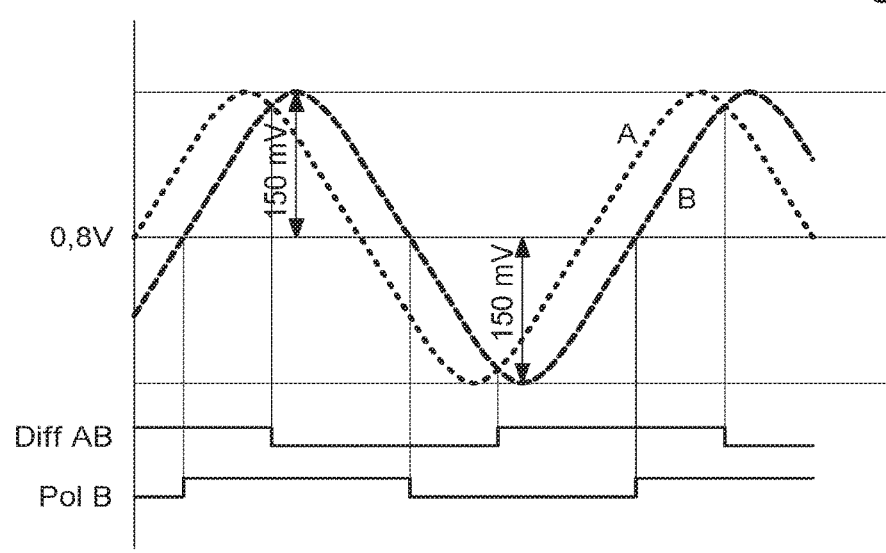
FIG. 6 shows signal diagrams illustrating values of induced voltages in the two inductors of the circuit of FIG. 2 during the measurement phase and comparator outputs of the circuit of FIG. 2.

A measurement phase is explained next. The first comparator 15 is used to track the points where the induced voltages of the first and second inductors A, B cross. In other words, the output signal of first comparator equals 1 if $V_{IA} > V_{IB}$, otherwise the output equals 0, where $V_{IA}$ is the induced voltage in the first inductor A, while $V_{IB}$ is the induced voltage in the second inductor B. The output signal of the first comparator may thus be referred to as a difference signal between the induced voltages in the first and second inductors A, B and abbreviated as Diff_AB. The second comparator 17 is used to track the sign of the voltage induced in the second inductor B. The output of the second comparator equals 1 if the sign of the induced voltage is positive, otherwise the output of the second comparator equals 0. The output signal of the second comparator may thus be referred to as a polarity signal of the voltage induced in the second inductor B and abbreviated as Pol_B. In a steady operational state, the motor drive circuit is most of the time, e.g. 90% of the time, in the measurement phase to measure or track the above two parameters (i.e. the induced voltage crossing points and the sign of the voltage induced in the second inductor B). During the measurement phase, the switches SAH and SComAB are closed while the other switches are open. FIG. 5 illustrates how the electrical circuit is connected during the measurement phase, while FIG. 6 illustrates the waveforms of the induced voltages and the signals Diff_AB and Pol_B. In this example, in a given rotation, the rotor magnets face first the first inductor A before facing the second inductor B (i.e. the rotor rotates clockwise).

As explained above, the present invention aims to reduce the motor power consumption or more specifically the power consumption of the motor drive unit. As explained next in more detail, this is achieved by minimising the voltage across the inductor circuit. In other words, the current injected into the inductors is minimised and consequently also the resistive heating losses can be minimised. Advantageously the voltage Vbat is at least twice as high as a peak induced voltage value of the inductor circuit, i.e. the peak of the sum of the induced voltages in the first and second inductors A, B. Furthermore, advantageously at any time instant, the voltage across the inductor circuit is higher than the sum of the induced voltages. The proposed solution is next explained in more detail. Some numerical values are considered in the example below, but these values are by no means limiting and serve merely to better illustrate the teachings of the present invention. The example below considers a supply voltage Vbat of 1.2 V and a targeted effective supply voltage of 0.4 V (i.e. the voltage drop across the inductor circuit). As explained below, referring to the circuit configuration of FIG. 2, the idea is to generate a series of low energy drive voltage pulses by successively 1) connecting the voltage supply source 9 through the inductor circuit to one of the first and second capacitors CH, CL;
2) connecting the first and second capacitors CH, CL to each other through the inductor circuit; and
3) connecting the other one of the first and second capacitors CH, CL to ground through the inductor circuit.

By properly selecting the capacity values of the capacitors CH, CL, by keeping the above three phases (or pulses) of equal length, and by successively repeating the above phases in this order, the motor drive circuit quickly reaches the steady operational state during which the voltage drop across the inductor circuit is the same for all the phases (or pulses). In this particular example, the voltage drop (i.e. the targeted effective supply voltage) would thus be 0.4 V for each of the above three phases. By distributing the above phases in the time domain, the motor drive system is thus configured to drive the motor in three different successive phases such that each phase produces an identical torque with a current which equals an optimal current (from a power consumption point of view).

Figure 7:
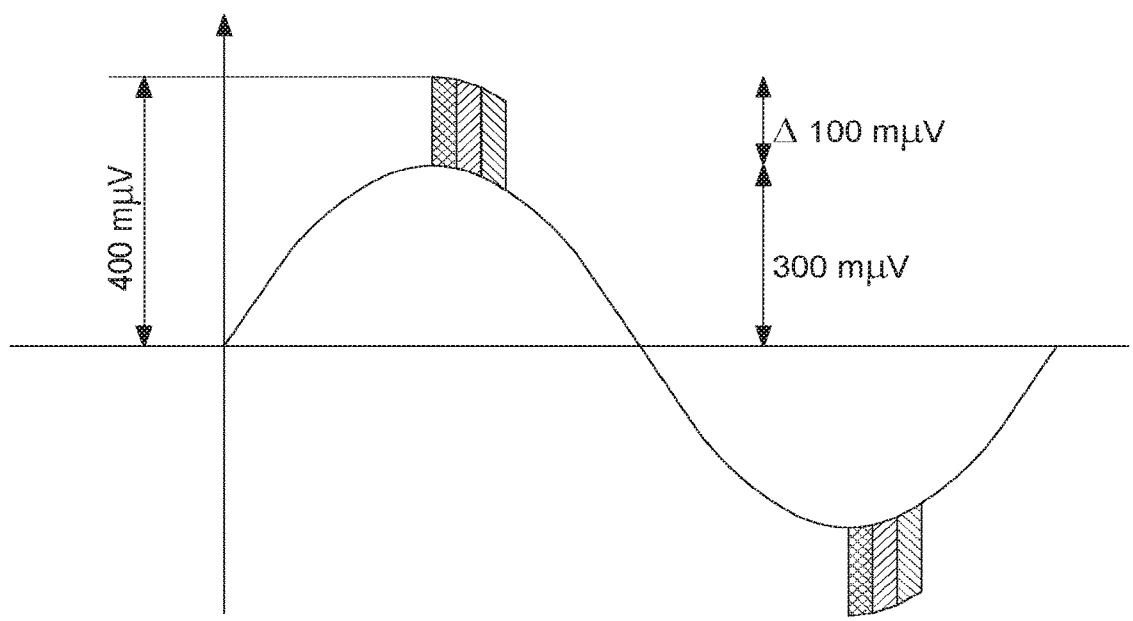
FIG. 7 shows a waveform of a sum of the induced voltages in the inductors of the circuit of FIG. 2 and low energy pulses generated according to a first example.
Figure 8:
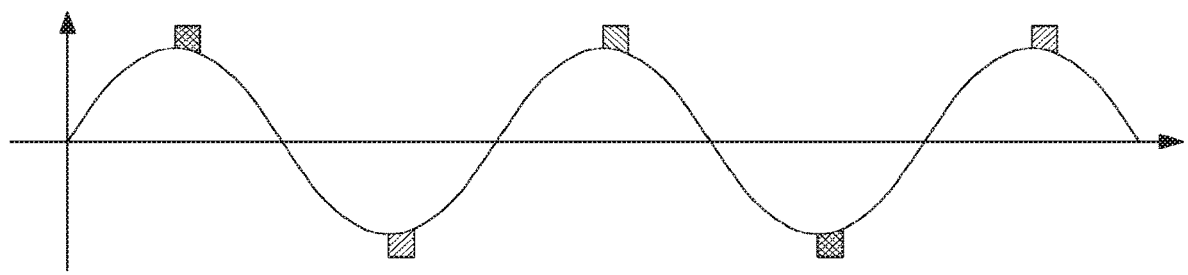
FIG. 8 shows the waveform of the sum of the induced voltages in the inductors of the circuit of FIG. 2 and low energy pulses generated according to a second example.

The scenario of FIG. 7 illustrates a situation, in which all the three phases above mentioned are generated immediately one after another, so that these three phases can be seen as three drive voltage pulses or as a same drive voltage pulse. In other words, there is substantially no time delay between any two successive phases of the above three phases. It is to be noted that the three phases are ideally generated as close as possible to the peak/maximum of the sum of the two induced voltages. The sinusoidal curves shown in FIGS. 7 and 8 illustrate the sum of the two induced voltages of the first and second inductors A, B. It is assumed that the voltage supply provided to the two inductors arranged in series is sufficient for driving the rotor at its nominal speed with a useful voltage corresponding to the difference between the voltage supply and the maximum value of the sum of the induced voltages in the two inductors (maximum value of the inductor circuit). In FIG. 7 it can be seen that, once the three phases/pulses have been generated at the peak of the sum of the induced voltages, then the next three phases/pulses are again generated close to the following peak and respecting the order of the individual pulses. However, is it not necessary to generate these pulses at every peak. The exact time instant of generating these pulses is determined by the control unit 7 based on the state of the motor (e.g. once it has been determined that the motor is running too slow or too fast or is late, etc). The scenario of FIG. 8 illustrates a situation in which there is a given delay between each of the phases/pulses. In a variant, the pulse duration for each of the distinct phases in FIG. 8 is equal to the pulse duration of the three contiguous phases of the FIG. 7. In the example of FIG. 8, the delay corresponds to substantially the time difference between two successive peaks. However, here again, the time delay could be any delay determined by the control unit 7. Advantageously, the delay would in this scenario correspond to a time difference between two peaks multiplied by a positive integer (determined by the control unit based on the motor state).

FIGS. 9 to 14 illustrate how the currents are arranged to flow in the drive circuit during the first, second and third low energy pulses. The positive and negative drive voltage pulses are symmetrical. For this reason, only the scenarios corresponding to the positive drive voltage pulses ('drive voltage pulse(s)' is/are also simply named 'pulse(s)') are described in more detail below. The switches can be individually controlled by the control unit 7 which is also supplied by the supply voltage source 9. The scenarios below refer to the steady operational state, in which the first and second capacitors CH, CL have been charged such that in this example the voltages across these capacitors are 0.8 V and 0.4 V, respectively. At the beginning, before the circuit starts its operation, the voltages across these capacitors are both 0 V. It would typically take a certain number of cycles before the steady operational state can be reached. The required number of cycles depends for instance on the capacitances of these capacitors.

Figure 9:
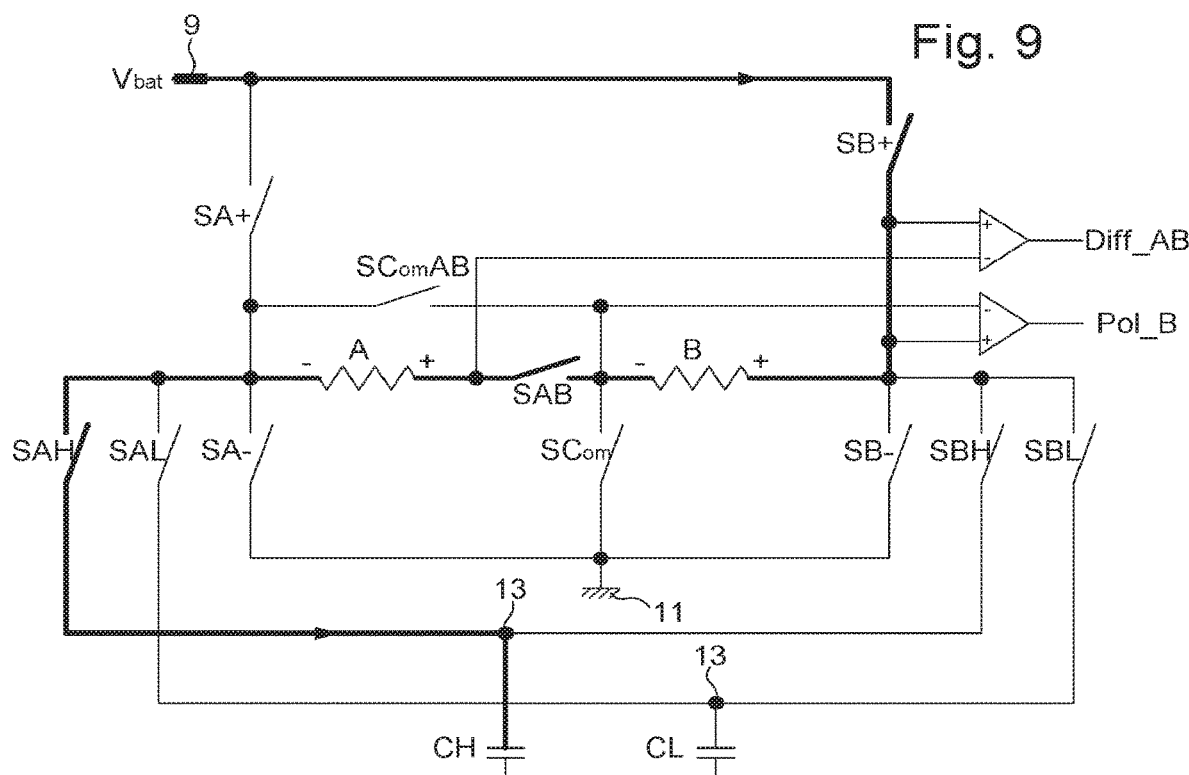
FIG. 9 shows the circuit of FIG. 2 and further illustrates how the current flows in the circuit during a first positive low energy pulse.
Figure 10:
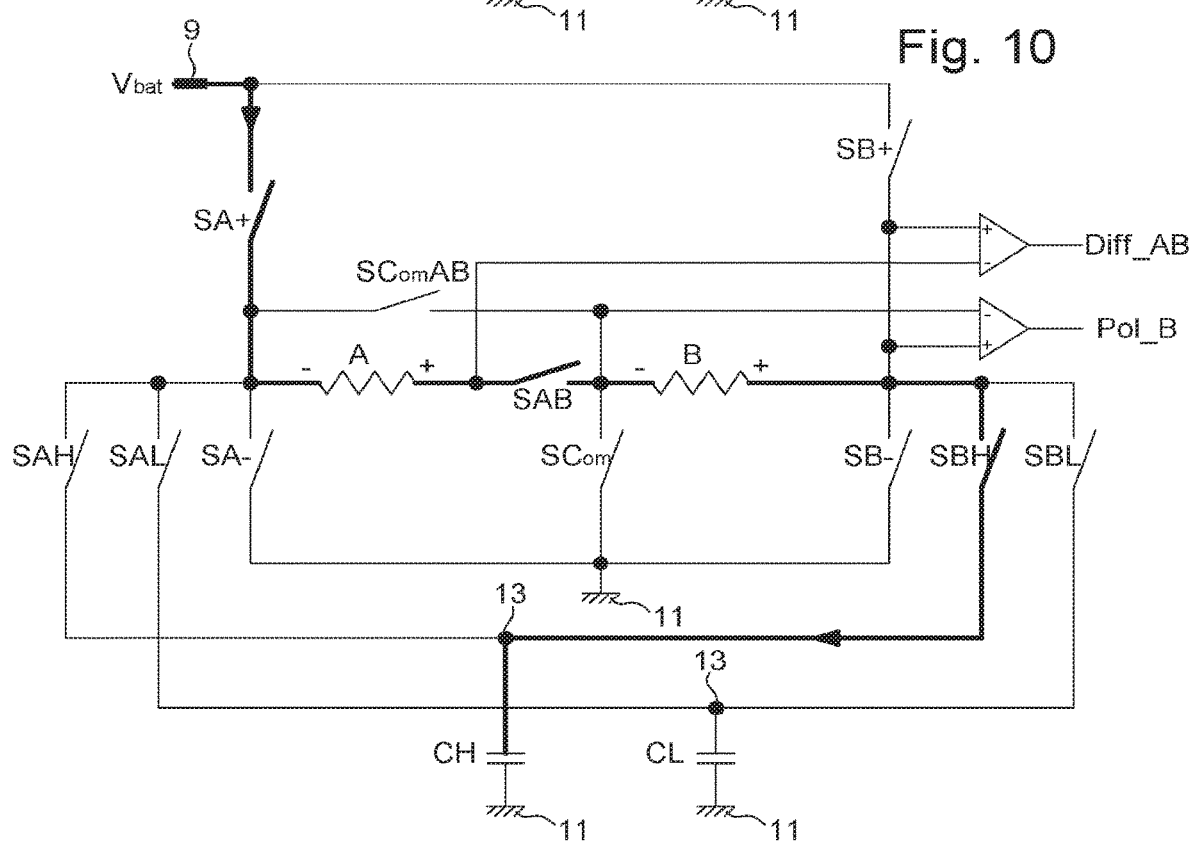
FIG. 10 shows the circuit of FIG. 2 and further illustrates how the current flows in the circuit during a first negative low energy pulse.

FIG. 9 illustrates how the current is arranged to flow in the drive circuit during a first positive low energy pulse. The switches SB+, SAB and SAH are closed for a first time duration, which in this example is 5 ms. During this time, the other switches are open. During the first pulse, the voltage supply source 9 is connected to the first capacitor CH through the inductor circuit. The voltage difference between the two end nodes of the inductor circuit is initially $\Delta U_1$=1.2 V−0.8 V=0.4 V. During the first positive pulse, the first capacitor CH charges progressively so that at the end of the first pulse, the voltage across the first capacitor is approximately 0.9 V, while the current decreases from 10 μA to 3 μA. FIG. 10 illustrates how the current flows in the drive circuit during a first negative low energy pulse.

Figure 11:
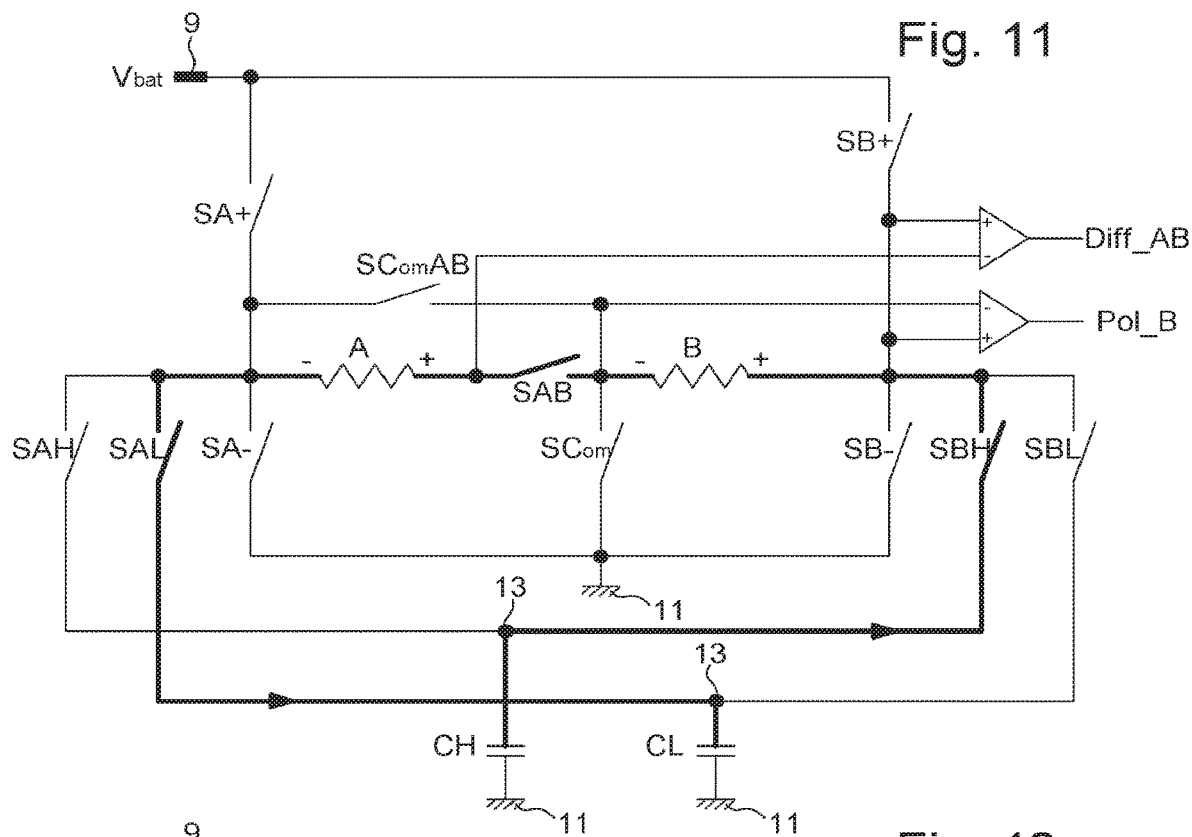
FIG. 11 shows the circuit of FIG. 2 and further illustrates how the current flows in the circuit during a second positive low energy pulse.
Figure 12:
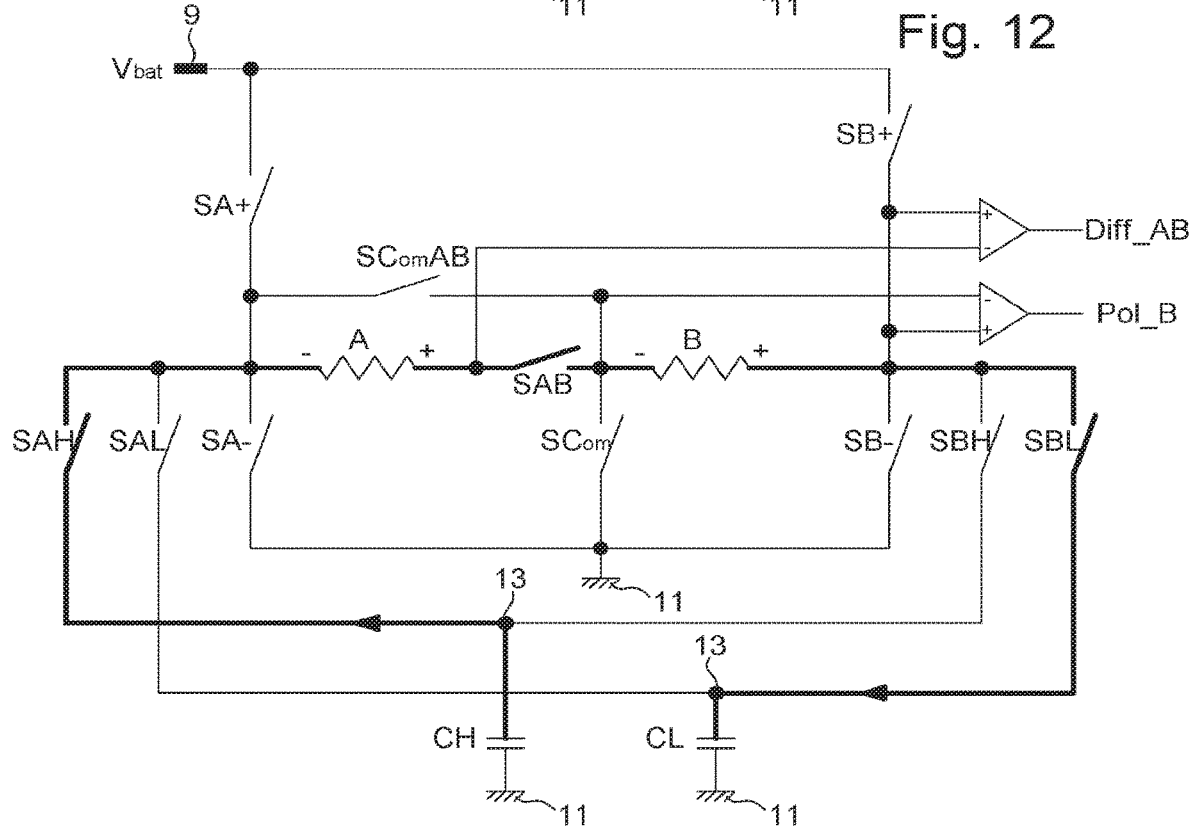
FIG. 12 shows the circuit of FIG. 2 and further illustrates how the current flows in the circuit during a second negative low energy pulse.

FIG. 11 illustrates how the current is arranged to flow in the drive circuit during a second positive low energy pulse. The switches SAL, SAB and SBH are closed for a second time duration, which in this example is 5 ms. In other words, the first time duration in this example substantially equals the second time duration. During this time, the other switches are open. During the second positive pulse, the first capacitor CH is connected to the second inductor B, while the second capacitor CL is connected to the first inductor A. Following the first pulse, the voltage difference between the two end nodes of the inductor circuit is now $\Delta U_2 = 0.9$ V–0.4 V=0.5 V. During the second positive pulse, the first capacitor discharges progressively by transferring charges to the second capacitor CL so that at the of the second pulse, the voltage across the first capacitor decreases from 0.9 V to 0.8 V, while the current decreases from 17 μA to 2 μA. Simultaneously, the voltage across the second capacitor increases from 0.4 V to 0.5 V. FIG. 12 illustrates how the current flows in the drive circuit during a second negative low energy pulse.

Figure 13:
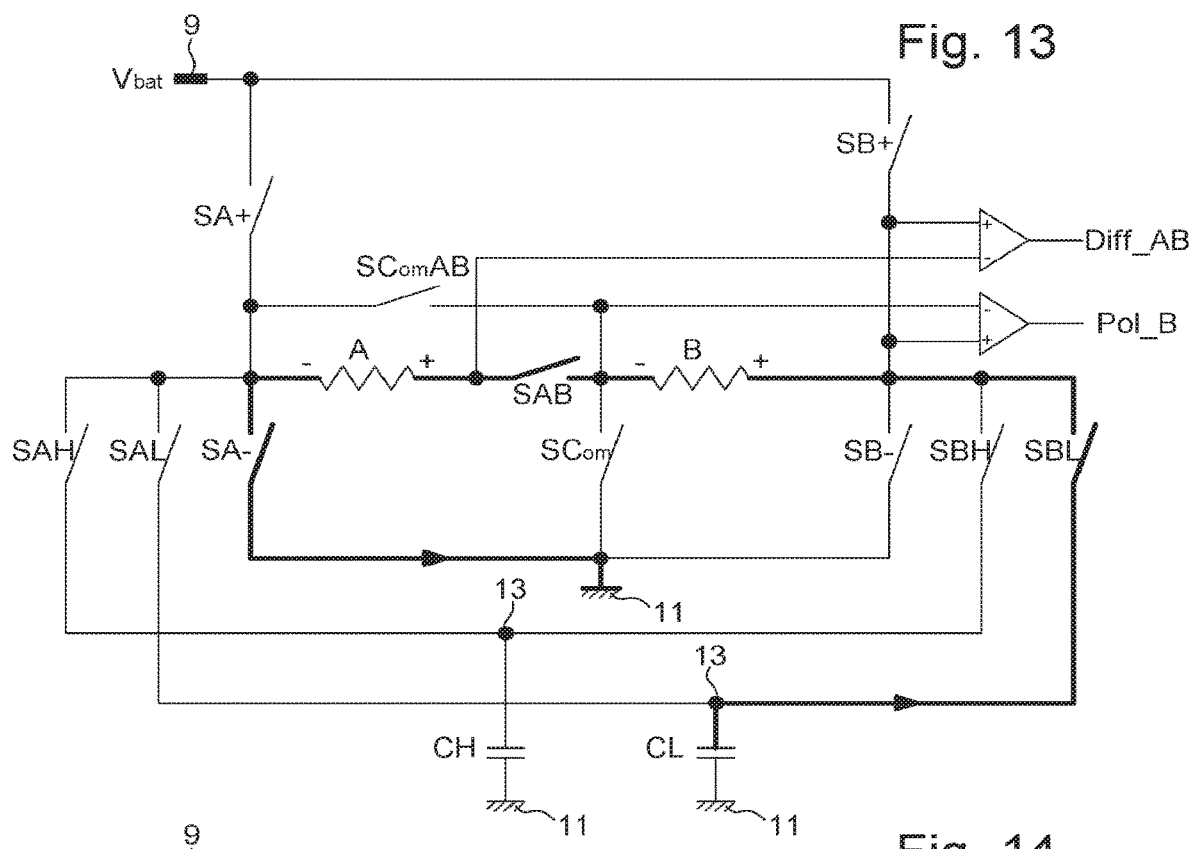
FIG. 13 shows the circuit of FIG. 2 and further illustrates how the current flows in the circuit during a third positive low energy pulse.
Figure 14:
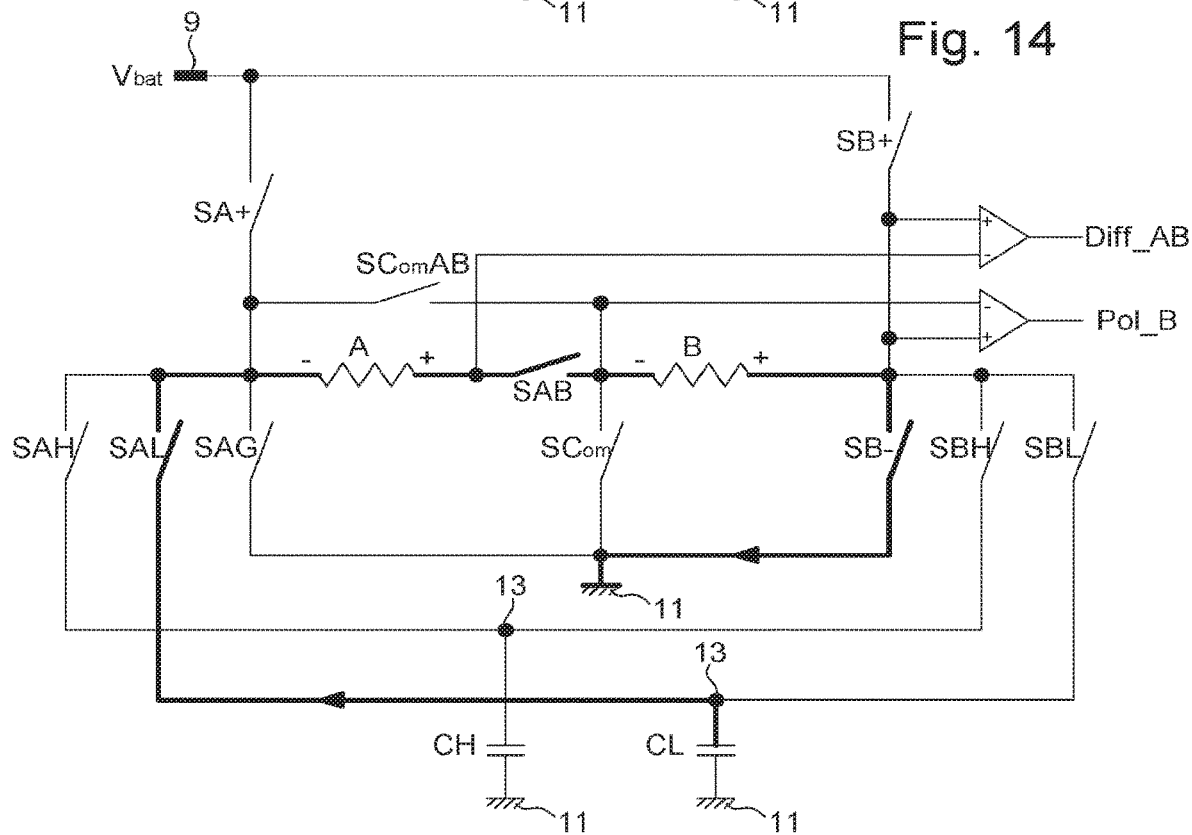
FIG. 14 shows the circuit of FIG. 2 and further illustrates how the current flows in the circuit during a third negative low energy pulse.

FIG. 13 illustrates how the current is arranged to flow in the drive circuit during a third positive low energy pulse. The switches SA–, SAB and SBL are closed for a third time duration, which in this example is 5 ms. In other words, the third time duration in this example substantially equals the first and second time durations. During this time, the other switches are open. During the third positive pulse, the second capacitor CL is connected to the second inductor B, while the first inductor A is grounded. Following the second pulse, the voltage difference between the two end nodes of the inductor circuit is now $\Delta U_3 = 0.5$ V–0 V=0.5 V. During the third positive pulse, the second capacitor CL discharges progressively so that at the of the third pulse, the voltage across the second capacitor CL decreases from 0.5 V to 0.4 V, while the current decreases from 18 μA to 6 μA. FIG. 14 illustrates how the current flows in the drive circuit during a third negative low energy pulse.

Figure 15:
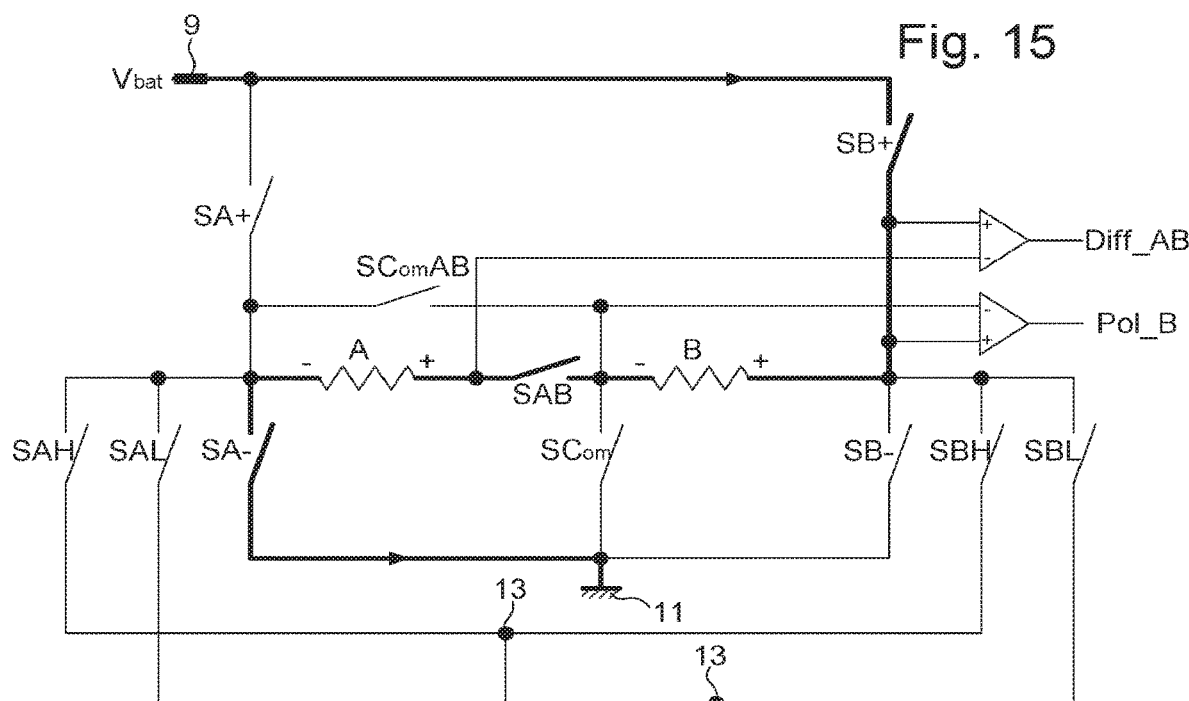
FIG. 15 shows the circuit of FIG. 2 and further illustrates how the current flows in the circuit during a positive high energy pulse.
Figure 16:
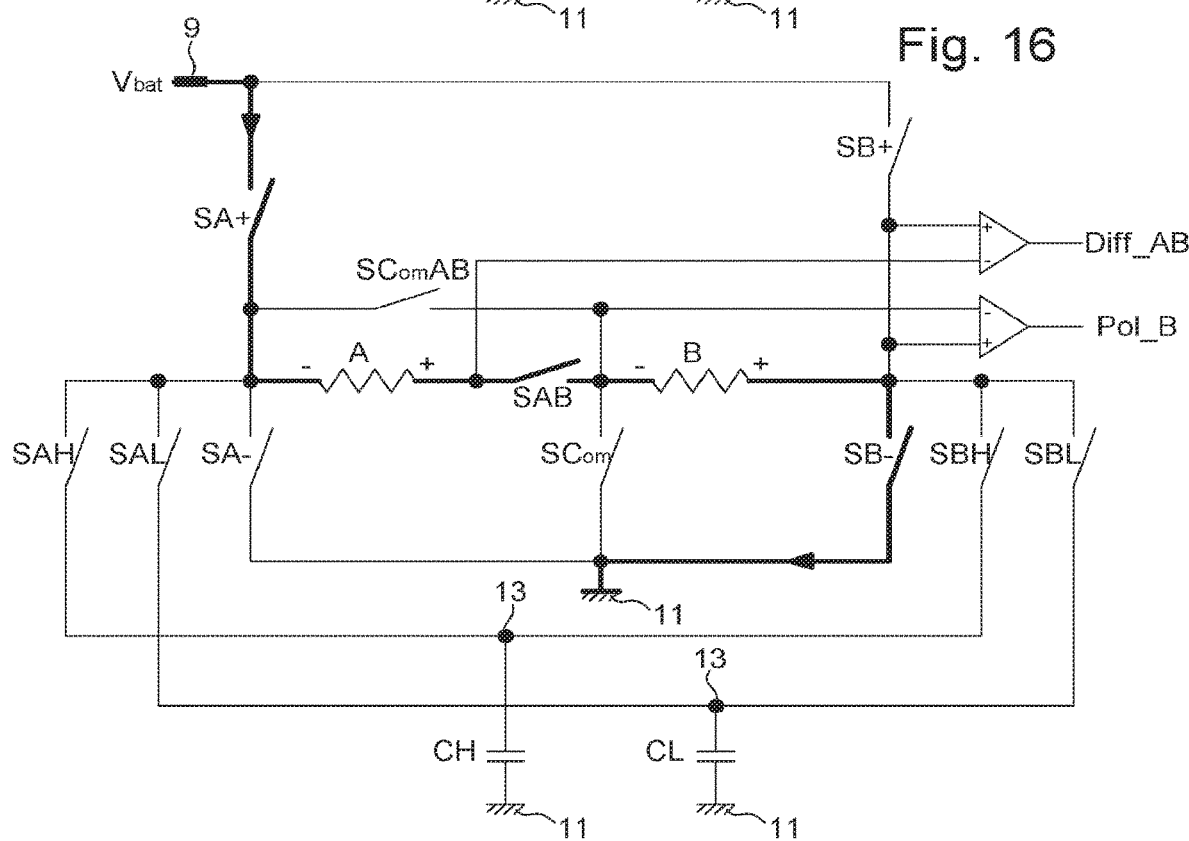
FIG. 16 shows the circuit of FIG. 2 and further illustrates how the current flows in the circuit during a negative high energy pulse.

If the motor is subject to a strong impact, if the rotor rotates overly slowly or if the motor has been stopped unintentionally, it may be necessary to accelerate the rotor quickly by a high energy pulse. This can be achieved by connecting the voltage supply source 9 to the inductor circuit for a given time duration, which may be substantially of the same length as the duration of the second start-up phase. This kind of configuration corresponds to a situation in which the inductor circuit is supplied through the traditional H-bridge. In other words, during a positive high energy pulse, the switches SB+, SAB and SA– are closed as shown in FIG. 15, while during a negative high energy pulse, the switches SA+, SAB and SB– are closed as shown in FIG. 16.

The above described motor drive circuit has two capacitors. However, the teachings of the present invention are applicable to motor drive circuits comprising any number of capacitors, as long as the number of capacitors N is at least one. For every new capacitor, two new switches are added to the drive circuit. Thus, the control unit 7 is configured to selectively open and close the switches to allow the motor drive unit to generate a series or multiple series of drive voltage pulses, each series comprising N+1 successive drive voltage pulses having each a given duration and triggered at a given time instant. Each drive voltage pulse causes a desired voltage drop across the inductor circuit. The drive voltage pulses are generated such that during a first pulse the power supply source is connected through the inductor circuit to a first capacitor. If N>1, then an n:th pulse is generated by connecting the inductor circuit between an (n−1):th capacitor and an n:th capacitor, n being a positive integer between 2 and N. A last pulse is generated by connecting the inductor circuit between an N:th capacitor and the reference voltage node 11.

Figure 17:
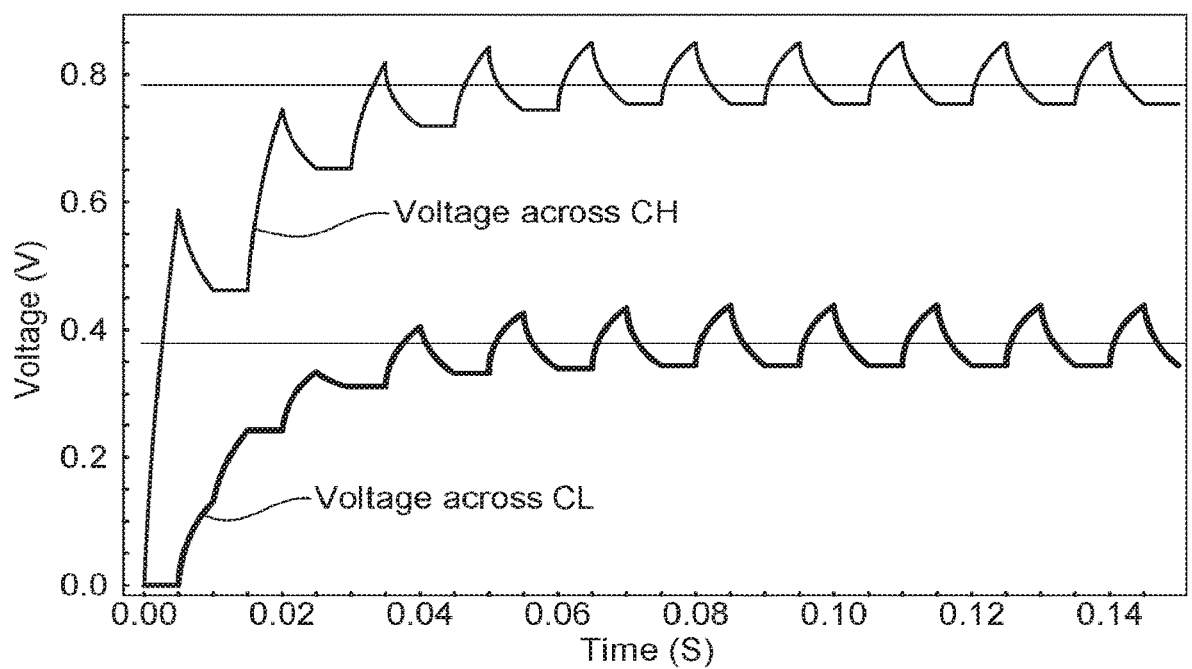
FIG. 17 shows two voltages curves respectively across the two capacitors of the circuit of FIG. 2.

With reference to FIGS. 9 to 14, it was explained how the positive and negative low energy pulses were generated. The given numerical values corresponded to the steady operational state. FIG. 17 illustrates graphically how the steady operational state can be achieved and how the circuit reaches an equilibrium in that state. More specifically, FIG. 17 concerns the implementation of FIG. 2 with two capacitors CL and CH having a same capacitance and a supply voltage Vbat which is equal to 1.2 V. In general, if the capacitance values are selected to be the same for all the capacitors and if the durations of the pulses are the same for all the pulses, then the voltage drop across the inductor circuit is substantially the same for all the pulses. The voltage drop would in this case be equal to Vbat/(N+1). Furthermore, in the steady operational state, the voltage values measured at the inductor circuit facing nodes are between Vbat/(N+1) and N×Vbat/(N+1), such that a K:th capacitor has a value (N+1−K)×Vbat/(N+1), where K is an integer between 1 and N.

It is to be noted that a further advantage of the present invention is that one or more of the voltage values across the capacitors may be used as a reference value (offset) for at least one of the comparators. In this manner the comparators would be able to sense both positive and negative induced voltage values.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A motor drive unit for driving a direct current electric motor comprising a stator and a moving part equipped with permanent magnets, the motor drive unit comprising:
   a power supply source for providing a supply voltage to the motor drive unit, the supply voltage having a value Vbat relative to a reference voltage node;
   a switch circuit comprising a set of switches between the power supply source and the reference voltage node;
   an inductor circuit forming the stator and connected through the switch circuit to the power supply source and to the reference voltage node;
   a capacitor circuit comprising N capacitors, N being a positive integer greater than zero, each of the capacitors being arranged between the reference voltage node and a respective inductor circuit facing node connected through the switch circuit to the inductor circuit; and
   a control circuit for controlling opening and closing of the switches; wherein the control circuit is configured to selectively open and close the switches to allow the motor drive unit to generate successive series of drive voltage pulses each comprising N+1 successive drive voltage pulses having each a given duration and triggered at a given time instant, so that each drive voltage pulse causes a voltage drop across the inductor circuit which is greater than an induced voltage across the inductor circuit during this drive voltage pulse; and wherein the control circuit is configured to generate each series of drive voltage pulses such that: first, the power supply source is connected through the inductor circuit to a first capacitor for generating a first drive voltage pulse; then, if N>1, the inductor circuit is connected between an (n−1):th capacitor and an n:th capacitor, n being a positive integer between 2 and N, for generating an n:th drive voltage pulse; and finally, the inductor circuit is connected between an N:th capacitor and the reference voltage node for generating a last drive voltage pulse.

2. The motor drive unit according to claim 1, wherein each one of the N capacitors is characterised by a capacitance value, and wherein the durations of the N+1 drive voltage pulses of each series are all substantially the same and the capacitance values of the N capacitors are all substantially the same such that, in a steady operational state of the motor drive unit, the voltage drop across the inductor circuit substantially equals Vbat/(N+1) for each one of the N+1 drive voltage pulses.

3. The motor drive unit according to claim 1, wherein the supply voltage is at least twice as high as a maximum induced voltage across the inductor circuit in a normal functioning mode of the motor.

4. The motor drive unit according to claim 2, wherein the supply voltage is at least twice as high as a maximum induced voltage across the inductor circuit in a normal functioning mode of the motor.

5. The motor drive unit according to claim 2, wherein the supply voltage value Vbat divided by a maximum induced voltage across the inductor circuit, in a normal functioning mode of the motor, is greater than N+1; and wherein the control circuit is configured to selectively open and close the switches such that each drive voltage pulse is generated when the induced voltage across the inductor circuit is substantially at an absolute maximum.

6. The motor drive unit according to claim 1, wherein the control circuit is configured to selectively open and close the switches such that the drive voltage pulses in a given series follow substantially immediately each other.

7. The motor drive unit according to claim 1, wherein the control circuit is configured to selectively open and close the switches such that the drive voltage pulses in a given series are separated from each other by a given time delay.

8. The motor drive unit according to claim 7, wherein the time delay corresponds to a half a period of an induced voltage in the inductor circuit multiplied by a positive integer.

9. The motor drive unit according to claim 1, wherein the reference voltage node is at zero electric potential.

10. The motor drive unit according to claim 1, wherein the motor drive circuit comprises 7+(2×N) switches.

11. The motor drive unit according to claim 1, wherein the inductor circuit comprises two inductors which can be connected in series configuration during the drive voltage pulses.

12. The motor drive unit according to claim 11, wherein the motor drive unit comprises a measurement circuit for measuring a difference between two induced voltages respectively across the two inductors and a polarity of one of these two induced voltages.

13. The motor drive unit according to claim 12, wherein the two inductors are separated by a switch which is controlled so as to be non-conductive during measurement periods of the measurement circuit.

14. The motor drive unit according to claim 11, wherein the measurement circuit comprises a first comparator for measuring the difference between two induced voltages and a second comparator for measuring the polarity of one of these two induced voltages.

15. The motor drive unit according to claim 12, wherein the measurement circuit comprises a first comparator for measuring the difference between two induced voltages and a second comparator for measuring the polarity of one of these two induced voltages.

16. An electromechanical watch comprising the motor drive unit according to claim 1, wherein the motor comprises a continuous rotation rotor which can be driven by the motor drive unit.

17. An electromechanical watch comprising the motor drive unit according to claim 2, wherein the motor comprises a continuous rotation rotor which can be driven by the motor drive unit.

18. An electromechanical watch comprising the motor drive unit according to claim 5, wherein the motor comprises a continuous rotation rotor which can be driven by the motor drive unit.

19. A method of operating a motor drive unit for driving a direct current electric motor comprising a rotor configured to rotate continuously and equipped with permanent magnets, the motor drive unit comprising:
   a power supply source for providing a supply voltage to the motor drive unit, the supply voltage having a value Vbat relative to a reference voltage node;
   a switch circuit comprising a set of switches between the power supply source and the reference voltage node;
   an inductor circuit electromagnetically coupled to the rotor, this inductor circuit being connected through the switch circuit to the power supply source and to the reference voltage node;
   a capacitor circuit comprising N capacitors, N being a positive integer greater than zero, each of the capacitors being arranged between the reference voltage node and a respective inductor circuit facing node connected through the switch circuit to the inductor circuit; and
   a control circuit for controlling opening and closing of the switches;
   wherein, in a normal functioning mode, the supply voltage is higher than a maximum induced voltage across the inductor circuit; wherein the control circuit is configured to selectively open and close the switches to allow the motor drive unit to generate successive series of drive voltage pulses each comprising N+1 successive drive voltage pulses having each a given duration and triggered at a given time instant, each drive voltage pulse causing a desired voltage drop across the inductor circuit which is greater than an induced voltage of the inductor circuit during this drive voltage pulse; and wherein the method comprises for each series of drive voltage pulses:
   first, generating the drive voltage pulses such that during a first drive voltage pulse the power supply source is connected through the inductor circuit to a first capacitor;
   then, if N>1, generating an n:th drive voltage pulse by connecting the inductor circuit between an (n−1):th capacitor; and an n:th capacitor, n being a positive integer between 2 and N; and finally, generating a last drive voltage pulse by connecting the inductor circuit between an N:th capacitor and the reference voltage node.

* * * * *